US010120892B2

(12) United States Patent
Patterson et al.

(10) Patent No.: US 10,120,892 B2
(45) Date of Patent: Nov. 6, 2018

(54) PROFILE VERIFICATION SERVICE

(71) Applicants: AT&T Intellectual Property I, L.P., Atlanta, GA (US); AT&T Mobility II LLC, Atlanta, GA (US)

(72) Inventors: David Patterson, Los Altos, CA (US); Jeremy Fix, Acworth, GA (US); Sheldon Kent Meredith, Roswell, GA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 432 days.

(21) Appl. No.: 14/457,596

(22) Filed: Aug. 12, 2014

(65) Prior Publication Data

US 2016/0048549 A1 Feb. 18, 2016

(51) Int. Cl.
*G06F 17/30* (2006.01)
*H04L 29/08* (2006.01)
*G06Q 50/00* (2012.01)
*H04W 4/02* (2018.01)

(52) U.S. Cl.
CPC ....... *G06F 17/30371* (2013.01); *G06Q 50/01* (2013.01); *H04L 67/306* (2013.01); *H04W 4/02* (2013.01)

(58) Field of Classification Search
USPC ........ 707/609, 687, 705, 790, 813, 821, 964
See application file for complete search history.

(56) References Cited

U.S. PATENT DOCUMENTS

| 8,250,097 | B2 | 8/2012 | Rhodes |
| 8,438,127 | B2 | 5/2013 | Kurata et al. |
| 8,490,004 | B2 | 7/2013 | Shuster |
| 8,504,559 | B1 * | 8/2013 | Elman ................. G06Q 30/08 705/321 |
| 8,552,855 | B2 | 10/2013 | Herickhoff et al. |

(Continued)

FOREIGN PATENT DOCUMENTS

EP 1914677 4/2008

OTHER PUBLICATIONS

Norcie et al., "Bootstrapping Trust in Online Dating: Social Verification of Online Dating Profiles," Financial Cryptography and Data Security, Springer Berlin Heidelberg, 2013, pp. 149-163.

(Continued)

*Primary Examiner* — Sana A Al-Hashemi
(74) *Attorney, Agent, or Firm* — Hartman & Citrin LLC

(57) ABSTRACT

Concepts and technologies are disclosed herein for providing and/or interacting with a profile verification service. A processor executing a profile verification service can receive a request to verify a user profile associated with a user of a social networking application. The processor can identify a computing device associated with the user profile, obtain location data that relates to the user profile and the computing device, and identify an activity associated with the computing device based upon the location data. The processor can determine if the user profile is accurate based upon the activity identified. If a determination is made that the user profile is accurate, the processor can verify the user profile. If a determination is made that the user profile is not accurate, the processor can update the user profile.

20 Claims, 9 Drawing Sheets

(56) References Cited

U.S. PATENT DOCUMENTS

| | | | |
|---|---|---|---|
| 8,725,569 | B2 | 5/2014 | Liang et al. |
| 8,910,201 | B1* | 12/2014 | Zamiska .......... H04N 21/44222 725/34 |
| 2006/0085419 | A1* | 4/2006 | Rosen ................ G06F 17/3087 |
| 2009/0228294 | A1 | 9/2009 | Choi et al. |
| 2010/0293090 | A1 | 11/2010 | Domenikos et al. |
| 2010/0332330 | A1* | 12/2010 | Goel ...................... G06Q 30/02 705/14.66 |
| 2011/0289011 | A1 | 11/2011 | Hull et al. |
| 2012/0159647 | A1* | 6/2012 | Sanin ..................... H04L 51/32 726/28 |
| 2012/0192258 | A1 | 7/2012 | Spencer et al. |
| 2012/0246089 | A1 | 9/2012 | Sikes |
| 2013/0036458 | A1 | 2/2013 | Liberman et al. |
| 2013/0137464 | A1* | 5/2013 | Kramer .................. G06Q 30/02 455/456.3 |
| 2014/0156750 | A1 | 6/2014 | De Cristofaro et al. |

OTHER PUBLICATIONS

Bao et al., "A Survey on Recommendations in Location-Based Social Networks," submitted to GeoInformatica, 2014.

* cited by examiner

PROFILE VERIFICATION SERVICE

BACKGROUND

Social networking has become a popular feature or service for various web-based applications, services, sites, and the like. Social networking services sometimes can include social networks for users, where each user and his or her network "connections" can create a user profile that can identify various aspects of the user's life. The user profiles can include, for example, the user's name, the user's location, and as much or as little information as the user chooses to share such as likes, interests, hobbies, occupation, education details, and other information.

Online dating services have also become popular services. In an online dating service, a user can create a user profile and provide information that may be similar to the user profile described above for social networking services. Thus, a user of a dating service may include his or her name, location, likes, interests, hobbies, employment information, education information, other information, or the like. Thus, a user of the dating service may search for other users based upon any information that may be entered to search for compatible users and/or perspective dates.

One problem with social networking services and/or online dating services may be a frequent misrepresentation of personal information. With regard to dating services, users may provide information that is thought to be attractive to other users, but which may be inaccurate. For example, a user may indicate that he or she exercises frequently, where the user may in reality never exercise or may exercise infrequently. Similarly, a user may say he or she is engaged in college studies, while in reality the user may not actually be a student.

Social networking services and online dating services may be unable to ensure the veracity of users' information. While much of the misrepresentation occurring on the Internet may be of little consequence, a user's personal safety may be at risk in the case of dating services or social networking services as some users may disclose a great deal of personal information and/or details. In various other applications, the misrepresentation of information can result in lost time or inconvenience (e.g., providing an interview to a seemingly qualified candidate for a position), but may or may not pose any health or safety risk to other users. In either event, these services may suffer from frequent misrepresentation of information.

SUMMARY

The present disclosure is directed to providing and/or interacting with a profile verification service. A user profile can be created at or by a social networking service. The social networking service can include a traditional social networking service or other profile-based services or applications such as, for example, dating services, shopping services, marketplace services, auction sites, messaging applications, chat room services, buyer or seller services or accounts, combinations thereof, or the like. The user profile can be stored by a resource such as a server, a database, an application, a module, combinations thereof, or the like. The resource also can host or execute the social networking service or other service associated with other types of profiles such as shopping profiles, commenting profiles, dating profiles, or the like.

The profile verification service can be a callable service that can be called or otherwise requested to verify a user profile. In some embodiments, for example, the social networking service can provide profile verification for members. Thus, the social networking service can be configured to call the profile verification service, or may provide the functionality of the profile verification service, if desired, to verify contents of a user profile. In some other embodiments, a user or other entity may request verification of a user profile associated with the user or entity, or a user profile associated with another user or other entity. For example, a user of a social networking service may request profile verification of a profile of another user that has requested connecting to the user, a profile of another user requesting a date or introduction to the user, combinations thereof, or the like. The profile verification service can determine, based upon the request or another trigger, that the user profile is to be verified.

The profile verification service can identify a computing device associated with the user profile that is being verified by the profile verification service. The profile verification service also can obtain location data associated with a computing device. According to some embodiments, the profile verification service can analyze the location data to determine one or more locations visited by or otherwise associated with the computing device during a particular period of time. The profile verification service also can identify one or more activities associated with the locations determined by the profile verification service.

The profile verification service can access search engines or the like to identify activities associated with particular locations. The profile verification service also can communicate with the computing device to obtain profile data that can include, among other things, indications of activities undertaken at particular locations. The profile data also can include other information such as device identifiers, preferences for the profile verification service, device and/or service settings associated with the profile verification service and/or the computing device, combinations thereof, or the like. The profile verification service can analyze the location data, the profile data, and the user profile to identify activities associated with the location data, as well as activities associated with the user profile.

The profile verification service can store profile verification data at the data store, in some embodiments. The profile verification data can reflect histories, trends, or the like associated with the computing device and/or the user profile. The profile verification data also can reflect particular activities associated with particular locations. By way of example, a user may work at a fitness center, and as such that user may indicate presence at the fitness center as corresponding to an activity of "working" instead of "exercising." It should be understood that this example is illustrative and therefore should not be construed as being limiting in any way.

Based upon the analysis of the user profile, the profile verification service can identify one or more activities associated with the user profile. The profile verification service also can identify one or more activities associated with the computing device based upon one or more of the location data, the profile data, and/or the profile verification data. In various embodiments, the profile verification service can identify activities associated with the computing device based upon the location data. The profile verification service can compare the activities associated with the user profile and the activities associated with the location data.

The profile verification service can identify accuracies and/or inaccuracies in the user profile and take steps to correct the inaccuracies and/or to verify the user profile as being accurate. If the user profile does not contain any inaccuracies, the profile verification service can certify the user profile as being accurate. If the profile verification service detects one or more inaccuracies, the profile verification service can generate one or more profile updates and update the user profile before certifying the user profile as being accurate. As such, the profile verification service can verify a user profile as being accurate with or without updates to the profile.

According to one aspect of the concepts and technologies disclosed herein, a method is disclosed. A processor can execute a profile verification service. The method can include receiving, by the processor, a request to verify a user profile associated with a user of a social networking application. The processor can identify a computing device associated with the user profile, obtain location data that relates to the user profile and the computing device, and identify an activity associated with the computing device based upon the location data. The processor can determine if the user profile is accurate based upon the activity identified. If a determination is made that the user profile is accurate, the processor can verify the user profile. If a determination is made that the user profile is not accurate, the processor can update the user profile.

In some embodiments, the social networking application can include a dating service. Identifying the computing device can include querying the social networking application to identify the computing device. In some embodiments, obtaining the location data can include receiving location data from a location server. In some embodiments, the activity can include a first activity, and determining if the user profile is accurate can include determining a second activity associated with the user profile and comparing the first activity to the second activity. The user profile can be determined to be accurate if the first activity matches the second activity, and the user profile can be determined to not be accurate if the first activity does not match the second activity.

In some embodiments, updating the user profile can include identifying an inaccuracy in the user profile, generating a profile update, and providing the profile update to the social networking service to update the user profile. Identifying the activity can include causing the computing device to present a user interface at the computing device to obtain an indication that identifies the activity as an activity associated with a location indicated by the location data. Identifying the activity also or alternatively can include accessing a search engine to obtain information that identifies the activity as an activity associated with a location indicated by the location data.

In some embodiments, the method also can include storing profile verification data at a data store. The profile verification data can include data identifying the computing device as being associated with the user profile. In some embodiments, the profile verification data further can include a setting associated with the computing device and the user profile. The profile verification data can be obtained via interactions with a user interface displayed at the computing device. The user interface can include two or more location service selectors and two or more social networking profile source controls.

According to another aspect of the concepts and technologies disclosed herein, a system is disclosed. The system can include a processor and a memory. The memory can store computer-executable instructions that, when executed by the processor, cause the processor to perform operations. The operations can include receiving a request to verify a user profile associated with a user of a social networking application, identifying a computing device associated with the user profile, obtaining location data that relates to the user profile and the computing device, and identifying an activity associated with the computing device based upon the location data. The operations also can include determining if the user profile is accurate based upon the activity identified. If a determination is made that the user profile is accurate, the operations can include verifying the user profile. If a determination is made that the user profile is not accurate, the operations can include updating the user profile.

In some embodiments, the activity can include a first activity, and determining if the user profile is accurate can include determining a second activity associated with the user profile and comparing the first activity to the second activity. Determining if the user profile is accurate can include identifying the user profile as accurate if the first activity matches the second activity. Determining if the user profile is accurate can include identifying the user profile as not accurate if the first activity does not match the second activity.

In some embodiments, updating the user profile can include identifying an inaccuracy in the user profile, generating a profile update, and providing the profile update to the social networking service to update the user profile. In some embodiments, obtaining the location data can include receiving location data from a location server. The location server can include an element of a cellular communications network that supports communication of the computing device, and the computing device can include a smartphone.

According to yet another aspect, a computer storage medium is disclosed. The computer storage medium can have computer-executable instructions stored thereon that, when executed by a processor, cause the processor to perform operations. The operations can include receiving a request to verify a user profile associated with a user of a social networking application, identifying a computing device associated with the user profile, obtaining location data that relates to the user profile and the computing device, and identifying an activity associated with the computing device based upon the location data. The operations also can include determining if the user profile is accurate based upon the activity identified. If a determination is made that the user profile is accurate, the operations can include verifying the user profile. If a determination is made that the user profile is not accurate, the operations can include updating the user profile.

In some embodiments, the social networking service can include a dating service. In some embodiments, the user profile can be verified for purposes of ensuring safety of a further user of the dating service. In some embodiments, updating the user profile can include identifying an inaccuracy in the user profile, generating a profile update, and providing the profile update to the social networking service to update the user profile.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1:
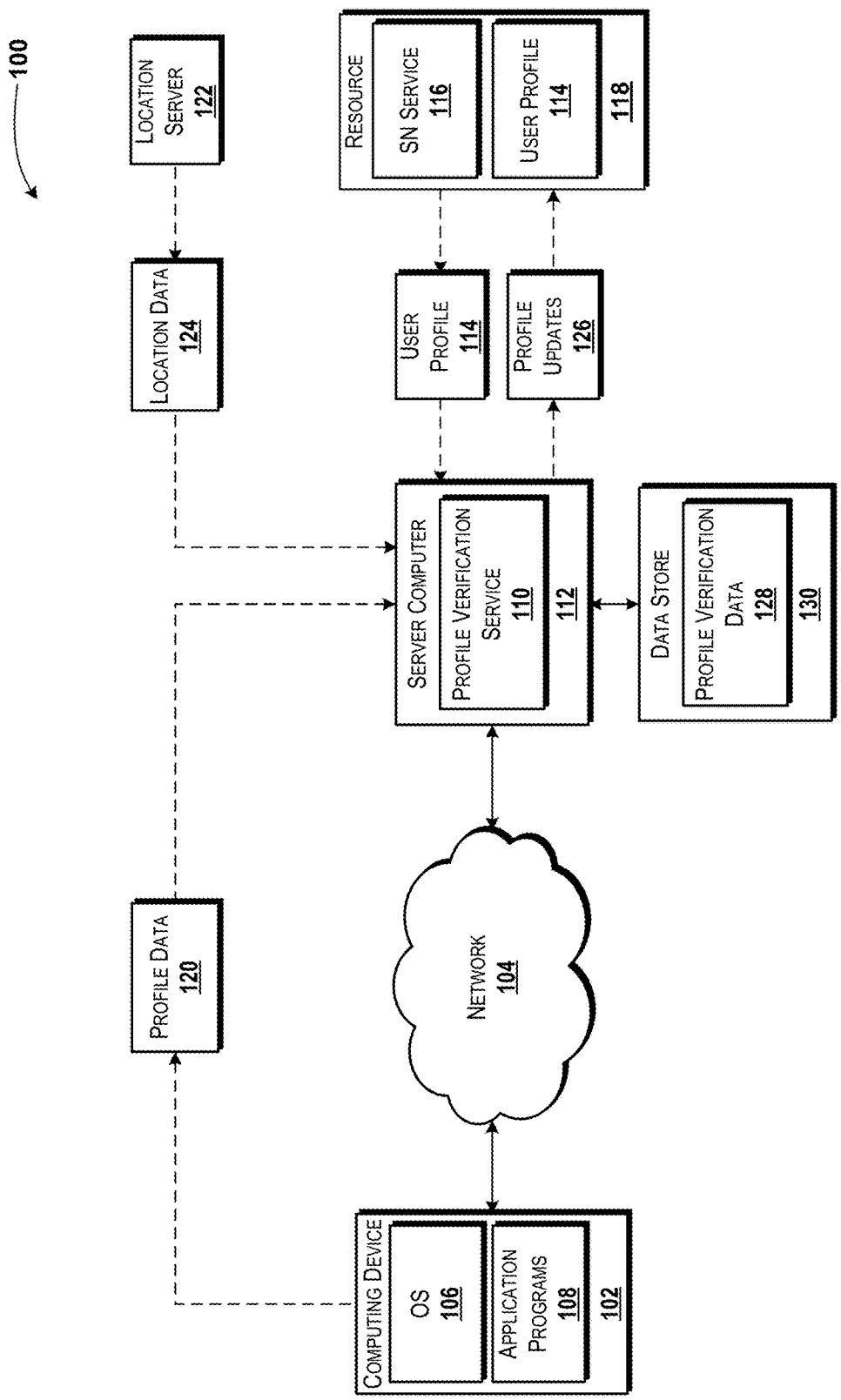
FIG. 1 is a system diagram illustrating an illustrative operating environment for various embodiments of the concepts and technologies described herein.

The following detailed description is directed to providing and/or interacting with a profile verification service. A user profile can be created at or by a social networking service. The social networking service can include a traditional social networking service or other profile-based services or applications such as, for example, dating services, shopping services, marketplace services, auction sites, messaging applications, chat room services, buyer or seller services or accounts, combinations thereof, or the like. The user profile can be stored by a resource such as a server, a database, an application, a module, combinations thereof, or the like. The resource also can host or execute the social networking service (or other service associated with other types of profiles as explained above).

The profile verification service can be a callable service that can be called or otherwise requested to verify a user profile. In some embodiments, for example, the social networking service can provide profile verification for members. Thus, the social networking service can be configured to call the profile verification service, or may provide the functionality of the profile verification service, if desired, to verify contents of a user profile. In some other embodiments, a user or other entity may request verification of a user profile associated with the user or entity, or a user profile associated with another user or other entity. For example, a user of a social networking service may request profile verification of a profile of another user that has requested connecting to the user, a profile of another user requesting a date or introduction to the user, combinations thereof, or the like. The profile verification service can determine, based upon the request or another trigger, that the user profile is to be verified.

The profile verification service can obtain location data associated with a computing device. The computing device can be associated with the user profile that is being verified by the profile verification service. According to some embodiments, the profile verification service can analyze the location data to determine one or more locations visited by or otherwise associated with the computing device during a particular period of time. The profile verification service also can identify one or more activities associated with the locations determined by the profile verification service.

The profile verification service can access search engines or the like to identify activities associated with particular locations. The profile verification service also can communicate with the computing device to obtain profile data that can include, among other things, indications of activities undertaken at particular locations. The profile data also can include other information such as device identifiers, preferences for the profile verification service, device and/or service settings associated with the profile verification service and/or the computing device, combinations thereof, or the like. The profile verification service can analyze the location data, the profile data, and the user profile to identify activities associated with the location data, as well as activities associated with the user profile.

The profile verification service can store profile verification data at the data store, in some embodiments. The profile verification data can reflect histories, trends, or the like associated with the computing device and/or the user profile. The profile verification data also can reflect particular activities associated with particular locations. Based upon the analysis of the user profile, the profile verification service can identify one or more activities associated with the user profile. The profile verification service also can identify one or more activities associated with the computing device based upon one or more of the location data, the profile data, and/or the profile verification data. In various embodiments, the profile verification service can identify activities associated with the computing device based upon the location data. The profile verification service can compare the activities associated with the user profile and the activities associated with the computing device The profile verification service can identify accuracies and inaccuracies in the user profile and take steps to correct the inaccuracies and/or to verify the user profile as accurate. If the user profile does not contain any inaccuracies, the profile verification service can certify the user profile as being accurate. If the profile verification service detects one or more inaccuracies, the profile verification service can generate one or more profile updates and update the user profile before certifying the user profile as being accurate. As such, the profile verification service can verify a user profile as being accurate with or without updates to the profile.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for a profile verification service will be described, according to an illustrative embodiment. The operating environment 100 shown in FIG. 1 includes a computing device 102 operating in communication with and/or as part of a communications network ("network") 104.

According to various embodiments, the functionality of the computing device 102 may be provided by one or more server computers, desktop computers, mobile telephones, laptop computers, set-top boxes, smartphones, smartwatches, other computing systems, and the like. It should be understood that the functionality of the computing device 102 can be provided by a single device, by two similar devices, and/or by two or more dissimilar devices. For purposes of describing the concepts and technologies disclosed herein, the computing device 102 is described herein as a smartphone. It should be understood that this embodiment is illustrative, and should not be construed as being limiting in any way.

The computing device 102 can execute an operating system 106 and one or more application programs 108. The operating system 106 can include a computer program that can control the operation of the computing device 102. The application programs 108 can include executable programs configured to execute on top of the operating system 106 to provide various functions.

According to various embodiments of the concepts and technologies described herein, the application programs 108 can include messaging applications, media playback applications (e.g., video, audio, or the like), web browsers, imaging (e.g., camera) applications, shopping applications, combinations thereof, or the like. Because the various types of application programs 108 supported by various devices that can function as the computing device 102 are generally understood, the application programs 108 are not further described herein. For purposes of illustrating and describing the concepts and technologies described herein, the application programs 108 are illustrated and described herein as including a web browser that supports interactions with other devices, applications, services, or other entities.

In some other embodiments, the application programs 108 can include a profile verification application that can be used to interface with a profile verification service 110 to request verifications, to control settings and/or options associated with the profile verification service 110, to provide user interfaces to users or other entities to confirm location/activity information, to track locations of the computing device 102, and/or for other purposes that will become apparent with reference to the description of the concepts and technologies described herein. Because the application programs 108 can include additional and/or alternative applications, it should be understood that this example is illustrative and should not be construed as being limiting in any way.

According to various embodiments, the application programs 108 can support interactions between the computing device 102 and a profile verification service 110. According to some other embodiments, the profile verification service 110 can operate without communicating with the computing device 102. According to various embodiments, the profile verification service 110 can be hosted and/or executed by a computing resource such as a server computer 112. It should be understood that this example is illustrative and therefore should not be construed as being limiting in any way.

The profile verification service 110 can receive a request or service call (hereinafter referred to as a "request") to verify a user profile 114 or other information associated with a user. In some embodiments, as shown in FIG. 1, the profile verification service 110 can receive a request to verify a user profile 114 that is associated with a social networking, dating, or other service (hereinafter referred to as a "social networking service" and/or labeled in FIG. 1 as a "SN service") 116. The social networking service 116 can be hosted by a resource 118 such as a server computer, a web server, or other computing device. Upon receiving or otherwise obtaining the user profile 114 from the social networking service 116, the profile verification service 110 can be configured to obtain or receive various types of information to verify details of the user profile 114.

According to various embodiments, the profile verification service 110 can obtain profile data 120 from the computing device 102. The profile data 120 can include preferences, location data, and/or other information that can represent, for a user associated with the computing device 102, how geographic locations can correspond to various activities and/or profile details associated with the user or other entity. Some example embodiments of user interfaces that can be interacted with at the computing device 102 to control the profile verification service 110 and/or to create or modify the profile data 120 will be illustrated and described in more detail below, particularly with reference to FIGS. 4A-4C.

According to various embodiments of the concepts and technologies described herein, the profile verification service 110 can be configured to verify the user profile 114 by using information included in the profile data 120, as well as location information that can represent locations associated with the computing device 102. In some embodiments, the profile verification service 110 can obtain the location information from the computing device 102. As such, the location information can be included in the profile data 120, in some implementations.

In some other embodiments, the profile verification service 110 can obtain the location information from other devices, modules, or entities such as a location server 122. Thus, the profile verification service 110 can obtain location data 124 from the location server 122 and use the location data 124 and the profile data 120 to verify aspects of the user profile 114.

According to various embodiments, the profile verification service 110 can analyze the location data 124 or location information obtained from the computing device 102. Based upon the analysis, the profile verification service 110 can determine where a computing device 102 has been located over a period of time. The profile verification service 110 can access various types of data from various sources to determine if an activity, store, business, or other entity or activity is associated with one or more locations represented by the location data 124. For example, the profile verification service 110 can access a mapping application, business database, location profile repository, or other entity to identify a business, institution, activity, or other entity associated with a particular location.

Based upon the information accessed by the profile verification service 110, the profile verification service 110 can determine what a person associated with the computing device 102 was doing during a particular time. For example, if the location data 124 indicates that the computing device 102 was located at a particular location for a particular amount of time, the profile verification service 110 can determine that the computing device 102 was engaged in a particular activity associated with that location for the period of time. Thus, for example, if the location corresponds to a gym, the profile verification service 110 can determine that a user associated with the computing device 102 was exercising at the gym during a period of time that corresponds to a time during which the computing device 102 was located at the location associated with the gym. It should be understood that this example is illustrative and therefore should not be construed as being limiting in any way.

In some embodiments, the profile verification service 110 can be configured to communicate with the computing device 102 to verify a location of the user or other entity, for example by generating a user interface (or data for generating a user interface). The computing device 102 can display the user interface. The user interface can include an indication of a location and/or ask for verification of an activity or action being undertaken by a user or other entity associated with the computing device 102 at the location. An example user interface for verifying a user location or activity is illustrated and described below with reference to FIG. 4C. It should be understood that this example is illustrative and therefore should not be construed as being limiting in any way.

If the profile verification service 110 verifies the activity and/or location as matching the user profile 114, the profile verification service 110 can determine that the user profile 114 is accurate. In some embodiments, the profile verification service 110 can be configured to generate a certificate, approval, or the like for verifying the user profile 114. Thus, some contemplated embodiments of the concepts and technologies described herein include displaying a seal, certificate, or other data that can indicate that the user profile 114 has been verified. Such a service may be viewed by social networking or dating service users as an enhanced or premium service and therefore may be charged for in some embodiments. Users also can be given the opportunity to opt-in or opt-out of the profile verification service 110 for perceived privacy considerations or other considerations. It should be understood that the above example of verifying the user profile 114 is illustrative and therefore should not be construed as being limiting in any way.

If the profile verification service 110 does not verify the activity and/or location as matching the user profile 114, or if the profile verification service 110 determines that the location and/or activity do not match a detail of the user profile 114, the profile verification service 110 can determine that the user profile 114 is inaccurate. In some embodiments, the profile verification service 110 can be configured to generate one or more profile updates 126, if enabled by a user or other entity, a social networking service 116 or other application, module, or service, or the like. Thus, the profile verification service 110 can be configured to update the user profile 114 to reflect the determined activity and/or location information determined by the profile verification service 110.

After submitting one or more profile updates 126 to the social networking service 116, or upon determining that the user profile 114 has been updated to correct the determined inaccuracies, the profile verification service 110 can, as noted above, approve the user profile 114 as being accurate. It should be understood that the profile verification service 110 can provide data indicating the inaccuracies to a user associated with the user profile 114 if desired, instead of or in addition to providing the profile updates 126 to the social networking service 116. Thus, some contemplated embodiments of the concepts and technologies described herein include displaying a seal, certificate, or other data that can indicate that the user profile 114 has been updated and verified. It should be understood that this example is illustrative and therefore should not be construed as being limiting in any way.

In some embodiments, the profile verification service 110 can be configured to store service preferences; profile preferences; profile histories; location trends, histories, or other information; linked user profile information; and/or other information or data as profile verification data 128. The profile verification service 110 can be configured to store the profile verification data 128 at a local memory or other data storage device, in some embodiments. In some other embodiments, the profile verification service 110 can be configured to store the profile verification data 128 at a remote data storage location or device such as, for example, a data store 130, or the like. According to various embodiments, the profile verification data 128 can be stored with data or other information that associates the profile verification data 128 with a user, account, device, or the like.

The profile verification data 128 can be stored in a table, database, or other data structure that can support querying and/or other lookup operations. As such, the profile verification data 128 can be searched or queried according to various aspects of the profile verification data 128, and the profile verification service 110 can identify relevant profile verification data 128 based upon various aspects of the profile verification data 128 including, but not limited to, a user, device, account, location, profile activity, and/or other aspect of the request or related information, or the like. Because the profile verification data 128 can be queried or searched based upon other information and/or considerations, it should be understood that these examples are illustrative and therefore should not be construed as being limiting in any way.

In practice, a user or entity can create a user profile 114 at a social networking service 116. The social networking service 116, as explained above, can include a traditional social networking service such as, for example, the FACEBOOK social networking service, the GOOGLE+ social networking service, the LINKEDIN professional networking service, or other social networking service, hundreds of which exist currently. The social networking service 116 also can include a dating service such as, but not limited to, the EHARMONY.COM dating service, the MATCH.COM dating service, other dating services, or the like. The user profile 114 also can be associated with other services or applications such as messaging applications, chat room accounts, buyer or seller accounts, combinations thereof, or the like. The user profile 114 can be stored by a resource 118 such as a server, database, or the like. The resource 118 also can host or execute the social networking service 116 in some embodiments.

According to some embodiments, the profile verification service 110 can be a callable service that can be requested to verify a user profile 114. In some embodiments, for example, the social networking service 116 can provide profile verification for its other members and therefore may call the profile verification service 110 or may provide the functionality of the profile verification service 110 itself, if desired. In some other embodiments, a user or other entity may request verification of a user profile 114 associated with the user or entity, or a user profile 114 associated with another user or other entity. The profile verification service 110 can determine, based upon the request or another trigger, that the user profile 114 is to be verified.

The profile verification service 110 can identify a computing device 102 associated with a user profile 114, and obtain location data 124 associated with the computing device 102. According to some embodiments, the profile verification service 110 can analyze the location data 124 to determine one or more locations visited by the computing device 102 during a particular period of time. The period of time can include a particular day, a particular week, a particular month, a particular year, or other time periods such as minutes, hours, days, weeks, months, years, or the like. The profile verification service 110 also can identify one or more activities associated with the locations determined by the profile verification service 110.

The profile verification service 110 can determine the activities in various ways. In some embodiments, the profile verification service 110 can access search engines or the like to identify activities associated with particular locations. In some other embodiments, the profile verification service 110 can communicate with the computing device 102 to obtain profile data 120 that can include, among other things, indications of activities undertaken at particular locations. The profile verification service 110 also can interact with users via one or more user interfaces to obtain data indicating what activities are undertaken at various locations. The profile data 120 also can include other information such as device identifiers, preferences for the profile verification service 110, device and/or service settings associated with the profile verification service 110 and/or the computing device 102, combinations thereof, or the like.

The profile verification service 110 can analyze the location data 124, the profile data 120, and the user profile 114 to identify activities associated with the location data 124, as well as activities associated with the user profile 114. The profile verification service 110 can store profile verification data 128 at the data store 130, in some embodiments. The profile verification data 128 can reflect histories, trends, or the like associated with the computing device 102 and/or the user profile 114. The profile verification data 128 also can reflect particular activities associated with particular locations, as well as preferences and/or settings associated with the user and/or the profile verification service 110 as noted above.

Based upon the analysis of the user profile 114, the profile verification service 110 can identify one or more activities associated with the user profile 114. The profile verification service 110 also can identify one or more activities associated with the computing device 102 based upon one or more of the location data 124, the profile data 120, and/or the profile verification data 128. In various embodiments, the profile verification service 110 can identify activities associated with the computing device 102 based solely upon the location data 124 and information reflecting activities associated with locations indicated by the location data 124. It should be understood that this example is illustrative and therefore should not be construed as being limiting in any way.

The profile verification service 110 can compare the activities associated with the user profile 114 and the activities associated with the computing device 102 (based upon the analysis of the location data 124, the profile data 120, and/or the profile verification data 128). The profile verification service 110 can identify inaccuracies, if any, in the user profile 114. If the user profile 114 does not contain any inaccuracies, the profile verification service 110 can verify the user profile 114 as being accurate. If the profile verification service 110 detects one or more inaccuracies, the profile verification service 110 can generate one or more profile updates 126 and update the user profile 114 before certifying the user profile 114 as being accurate. It should be understood that this example is illustrative and therefore should not be construed as being limiting in any way.

As such, it can be appreciated that the profile verification service 110 can verify a user profile 114 as being accurate. The profile verification service 110 also can detect inaccuracies in a user profile 114 and take corrective action to eliminate the determined inaccuracies. The profile verification service 110 also can provide a certification or report that reflects the accuracies and/or inaccuracies of the user profile 114, if desired.

FIG. 1 illustrates one computing device 102, one network 104, one server computer 112, one resource 118, one location server 122, and one data store 130. It should be understood, however, that various implementations of the operating environment 100 can include zero, one, or more than one computing device 102; zero, one, or more than one network 104; zero, one, or more than one server computer 112; zero, one, or more than one resource 118; zero, one, or more than one location server 122; and/or zero, one, or more than one data store 130. As such, the illustrated embodiment should be understood as being illustrative, and should not be construed as being limiting in any way.

Figure 2:
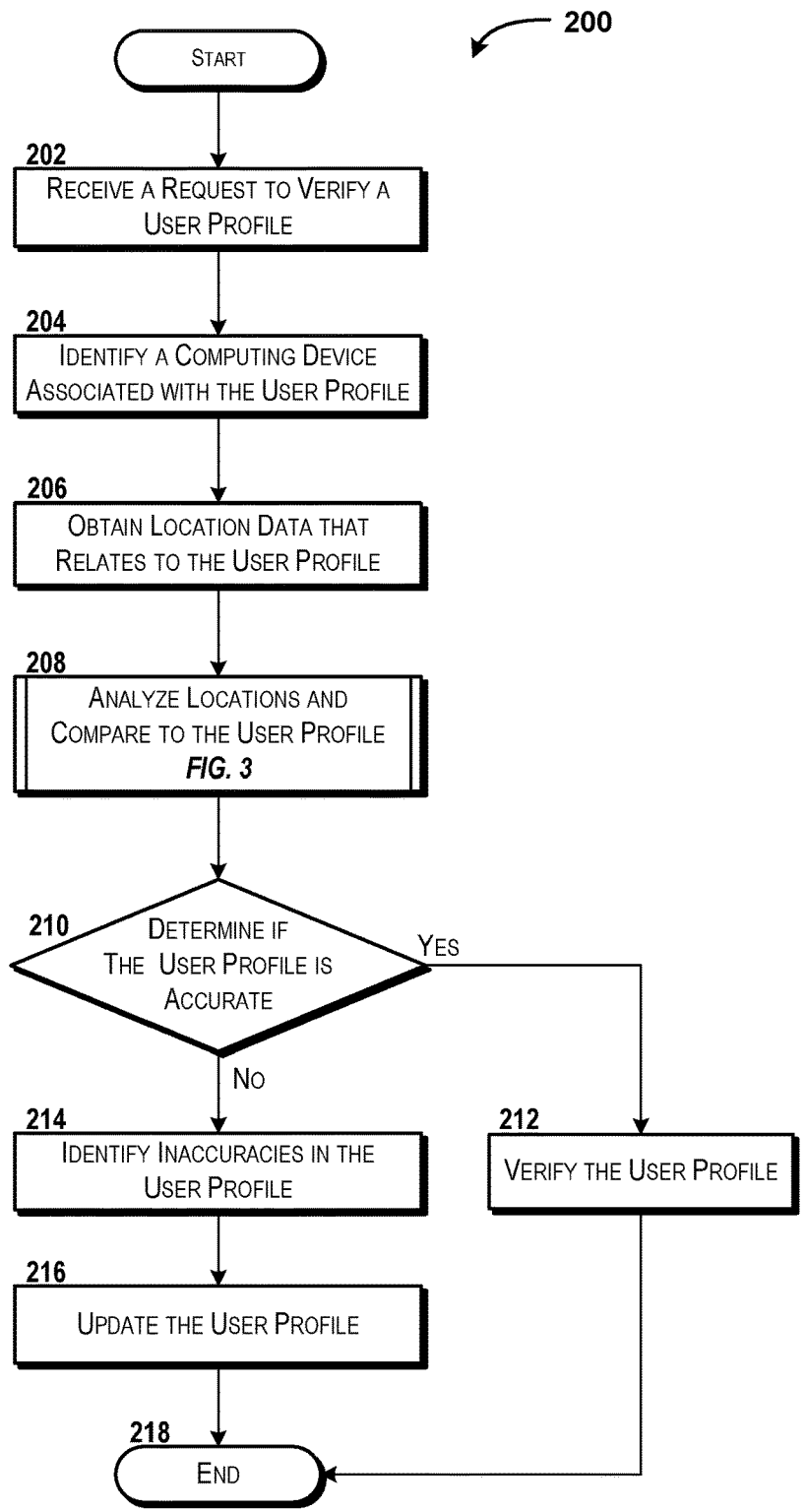
FIG. 2 is a flow diagram showing aspects of a method for verifying a user profile, according to an illustrative embodiment of the concepts and technologies described herein.

Turning now to FIG. 2, aspects of a method 200 for verifying a user profile will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the server computer 112, to perform one or more operations and/or causing the processor to direct other components of the computing system or device to perform one or more of the operations.

For purposes of illustrating and describing the concepts of the present disclosure, the methods disclosed herein are described as being performed by the server computer 112 via execution of one or more software modules such as, for example, the profile verification service 110. It should be understood that additional and/or alternative devices and/or network nodes can provide the functionality described herein via execution of one or more modules, applications, and/or other software including, but not limited to, the profile verification service 110. Thus, the illustrated embodiments are illustrative, and should not be viewed as being limiting in any way.

The method 200 begins at operation 202. At operation 202, the server computer 112 can receive a request to verify a user profile 114. According to various embodiments, the server computer 112 can receive the request in various different ways and/or from various entities. In some embodiments, for example, the request can be received from a device such as the computing device 102. Thus, for example, a user or other entity can generate a request to verify a user profile 114 for the user or another user via a web browser, a standalone application, a web application, a social networking application, a service call, combinations thereof, or the like.

In some other embodiments, the request received in operation 202 can be received from a social networking service 116 and/or a resource hosting the social networking service 116. Thus, the social networking service 116 can request verification of a user profile 114 by the profile verification service 110. In one contemplated example, the social networking service 116 can offer profile verification as a service for users and/or as part of a service. In another example, the social networking service 116 can include a dating service that can offer verification of user profiles 114 for various reasons. For example, the social networking service 116 can include a dating service, and the profile verification can be offered to members to ensure the veracity of prospective dates' profiles. It should be understood that these examples are illustrative and therefore should not be construed as being limiting in any way.

In still other embodiments, the request can be generated by and/or prompted by timers or timer jobs, for example, as part of a subscription or policy to verify user profiles 114. Thus, a user profile 114 can be created and stored by the social networking service 116, and the profile verification service 110 can be configured to maintain a timer job or other timing mechanism to prompt verification of the user profiles 114 from time to time to ensure veracity. Because the requests can be generated at other times, and because the request can be replaced by a trigger or other event (explicit or implicit), it should be understood that these examples are illustrative and therefore should not be construed as being limiting in any way.

From operation 202, the method 200 proceeds to operation 204. At operation 204, the server computer 112 can identify a computing device 102 associated with the user profile 114. According to various embodiments, the profile verification data 128 can include identification of users associated with the profile verification service 110 and/or user devices associated with the users and/or the profile verification service 110. This data can include user identifiers, identification of linked or associated user profiles 114, and identification of one or more devices such as the computing device 102 that are associated with the user and/or user profile 114. Thus, the profile verification service 110 can access the profile verification data 128 to identify the computing device 102 based upon an identification of the user profile 114 for which verification is requested.

In some other embodiments, a social networking service 116 can require or suggest that a user creating an account or profile such as the user profile 114 submit information identifying one or more devices that may be used by the user. Thus, the profile verification service 110 can be configured to identify the computing device 102 based upon information included with the profile verification request, based upon identification of the user profile 114, or the like. In still other embodiments, the profile verification service 110 can access the resource 118 and/or the social networking service 116 to request identification of the computing device 102. Because the computing device 102 can be identified in additional or alternative ways, it should be understood that these examples are illustrative and therefore should not be construed as being limiting in any way.

From operation 204, the method 200 proceeds to operation 206. At operation 206, the server computer 112 can obtain location data 124 that can relate to a user profile 114 that is to be verified. As explained above in detail, the location data 124 can be obtained from a module, application, device, or other entity such as, for example, a location server 122. In some other embodiments, the profile verification service 110 can obtain the location data 124 from other entities such as, for example, network connection logs, location tracking devices, and/or the computing device 102 or other device, which may provide the location data 124 from time to time and/or on demand.

Regardless of how the location data 124 is obtained, the location data 124 can indicate physical movements and/or a history of physical movements of the computing device 102 over time. Thus, the location data 124 can indicate geographic locations, time periods spent at the geographic locations, and/or other movement information. It should be understood that these examples are illustrative and therefore should not be construed as being limiting in any way.

From operation 206, the method 200 can proceed to operation 208. At operation 208, the server computer 112 can analyze locations indicated and/or reflected by the location data 124 and/or times spent at the locations. The server computer 112 also can compare the locations to information in the user profile 114. Details of comparing locations to information in a user profile 114 will be illustrated and described in more detail below with reference to FIG. 3. Briefly, however, it can be appreciated that the profile verification service 110 can identify locations visited by the computing device 102 as evidenced by the location data 124, determine times spent at the locations, and identify one or more activities associated with the locations and/or time periods. The server computer 112 can compare these activities to the information in the user profile 114 to determine if the user profile 114 is accurate or inaccurate.

From operation 208, the method 200 proceeds to operation 210. At operation 210, the server computer 112 can determine, based upon the analysis of operation 208, if the user profile 114 is accurate. In some embodiments, the server computer 112 can determine, in operation 210, whether or not the user profile 114 is inaccurate instead of determining whether or not the user profile 114 is accurate. In some embodiments, the server computer 112 can determine, in operation 210, if the activities and/or locations determined in operation 208 match the user profile 114. If the activities and/or locations determined in operation 208 match the user profile 114, the server computer 112 can determine that the user profile 114 is accurate. If the activities and/or locations determined in operation 208 do not match the user profile 114, the server computer 112 can determine that the user profile 114 is not accurate or is inaccurate.

If the server computer 112 determines, in operation 210, that the user profile 114 is accurate, the method 200 can proceed to operation 212. In operation 212, the server computer 112 can verify (or indicate as verified) the user profile 114. In some embodiments, the server computer 112 can provide an indication to a service or resource that is associated with the user profile 114 such as, for example, a social networking service 116 or the like (e.g., a dating service, a hiring service, or the like). In some other embodiments, the server computer 112 can provide an indication that the user profile 114 is verified to a party that requested the verification. Thus, some embodiments of the concepts and technologies described herein can be used to provide a verification of user profiles 114, where an indication can be provided to indicate that a user, company, or other entity having a user profile 114 has been verified as being accurate and/or truthful. It should be understood that this example is illustrative and therefore should not be construed as being limiting in any way.

If the server computer 112 determines, in operation 210, that the user profile 114 is not accurate (or determines that the user profile 114 is inaccurate), the method 200 can proceed to operation 214. In operation 214, the server computer 112 can identify inaccuracies in the user profile 114. It can be appreciated that the functionality of operation 214 can be performed by the server computer 112 during execution of the operation 208 illustrated and described above.

Thus, the server computer 112 can determine, in operation 214, what inaccuracies were identified in operation 208, or can identify inaccuracies. In some embodiments, for example, the server computer 112 can create a table or other data structure in operation 208. The data structure can store each identified activity or aspect of a user profile 114 along with an indication of whether or not the identified activity or aspect is accurate or inaccurate. Because inaccuracies can be tracked and/or identified in additional and/or alternative manners, it should be understood that this example is illustrative and therefore should not be construed as being limiting in any way.

From operation 214, the method 200 can proceed to operation 216. In operation 216, the server computer 112 can update the user profile 114. As illustrated and described above with reference to FIG. 1, the server computer 112 can generate one or more profile updates 126 and provide the profile updates 126 to a social networking service 116 or other module, application, service, or the like, which can be associated with the user profile 114. The server computer 112 alternatively can inform a user associated with the user profile 114 of the perceived inaccuracies and encourage the user to update the user profile 114. Thus communications with users or profile updates 126 can be used to update (or trigger updating of) the user profile 114 to correct the inaccuracies identified in operations 208 and/or 214.

According to various embodiments, the profile updates 126 can correspond to create, read, update, or delete ("CRUD") functions on the user profiles 114. As such, it can be appreciated that the user profiles 114 can be stored as data files in some embodiments, while in some other embodiments, the user profiles 114 can be stored as records in a database or other data structure. As such, the user profiles 114 can be updated by way of CRUD functions in some implementations of the concepts and technologies described herein. Thus, it can be appreciated that a user profile 114 associated with a user or device can be identified by way of executing a search operation on the user profiles 114, in some embodiments.

In some other embodiments, the user profiles 114 can be stored as standalone files or groups of files that can be updated by the profile updates 126. Thus, the user profiles 114 can include code that can be modified, created, or deleted by way of the profile updates 126 where the user profiles 114 may not be stored in a database or other data structure. Because the user profiles 114 can be stored in various formats, and because the user profiles 114 can be updated in various ways, it should be understood that these examples are illustrative and therefore should not be construed as being limiting in any way.

From operation 216, the method 200 proceeds to operation 218. The method 200 also can proceed to operation 218 from operation 212. The method 200 ends at operation 218.

Figure 3:
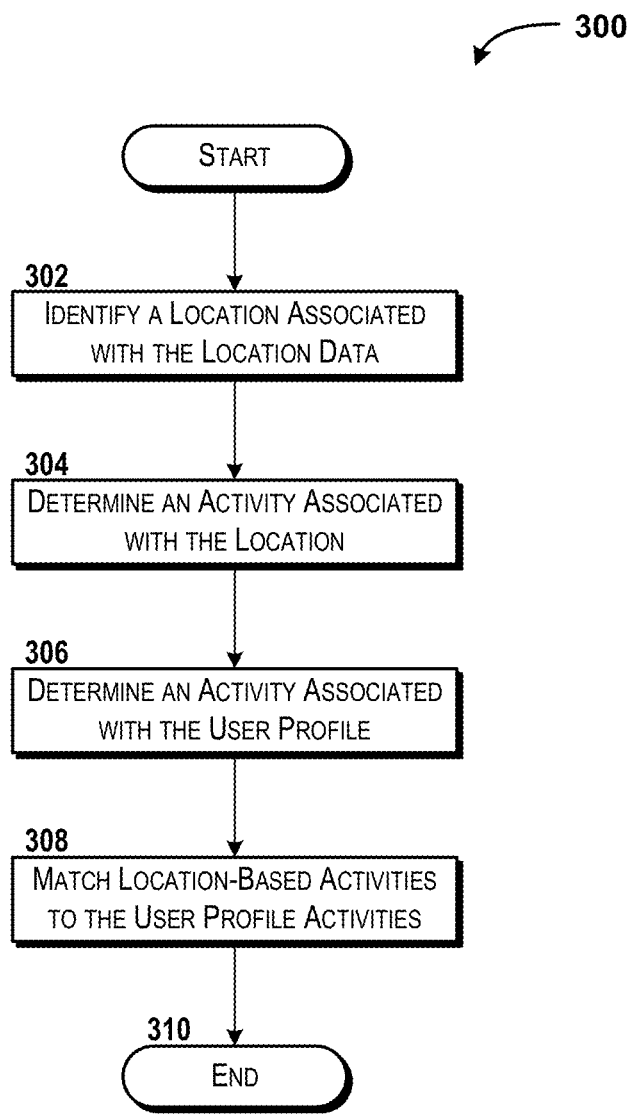
FIG. 3 is a flow diagram showing aspects of a method for verifying a user profile, according to another illustrative embodiment of the concepts and technologies described herein.

Turning now to FIG. 3, aspects of a method 300 for verifying a user profile will be described in detail, according to an illustrative embodiment. It should be understood that the method 300 can be, but is not necessarily, executed at operation 208 of the method 200 illustrated and described above with regard to FIG. 2. The method 300 begins at operation 302. At operation 302, the server computer 112 can identify a location associated with the location data 124. As illustrated and described above with reference to FIG. 2, the location data 124 can be obtained in operation 206 from a location server 122, a computing device 102, a network connection log, other location devices (e.g., location beacons at various locations, WiFi network service set identifier ("SSID") information, Internet protocol ("IP") address information, combinations thereof, or the like).

Thus, in operation 302, the server computer 112 can analyze the location data 124 obtained in operation 206, regardless of its source, to determine or identify a location associated with the location data 124. It should be understood that one or more locations may be identified in operation 302. In some embodiments, the location data 124 can include a log of location information, times spent at the locations, or the like. Thus, it should be appreciated that the server computer 112 can determine the location(s) in operation 302 by way of extracting information from a log, or by way of analysis of location data 124 and/or location logs. Because the location can be identified in additional and/or alternative manners, it should be understood that these examples are illustrative and therefore should not be construed as being limiting in any way.

From operation 302, the method 300 proceeds to operation 304. At operation 304, the server computer can determine an activity associated with the location identified in operation 302. As noted above, one or more locations can be determined in operation 302. As such, operation 304 can include determining one or more activities as well. As such, the illustrated embodiment of determining one activity associated with the location should be understood as being illustrative of one embodiment and should not be construed as being limiting in any way.

The server computer 112 can, by way of execution of the profile verification service 110, identify an activity or action associated with the location in a variety of manners. In some embodiments, for example, the profile verification service 110 can communicate with the computing device 102 to determine or verify an activity that occurs or occurred at the location. For example, the server computer 112 can be configured to prompt the computing device 102 to present a user interface. The user interface can obtain information (or verification of information) from a user or other entity at the computing device 102 to determine an activity undertaken at the location determined or identified in operation 302. An example user interface for identifying a location visited by a user or other entity is illustrated and described below with reference to FIG. 4C.

In some other embodiments, the profile verification service 110 can access various data sources to associate an activity with a particular location identified in operation 302. For example, the profile verification service 110 can access one or more geographic information system ("GIS") elements to identify a venue, business, activity, institution, or other entity or action associated with a particular geographic location. In some other embodiments, the profile verification service 110 can access one or more search engines or other search functions to identify a venue, business, institution, activity, or other entity or action associated with the location determined in operation 302. Because the activity can be determined in a number of ways including, but not limited to the example embodiments provided above, it should be understood that these examples are illustrative and therefore should not be construed as being limiting in any way.

From operation 304, the method 300 proceeds to operation 306. At operation 306, the server computer 112 can determine an activity associated with the user profile 114. It should be understood that operation 306 can include determining one or more activities associated with the user profile 114. As such, the illustrated embodiment of determining one activity associated with the user profile 114 should be understood as being illustrative of only one embodiment and should not be construed as being limiting in any way.

During the analysis at operation 306, the server computer 112 can determine one or more activities associated with the user profile 114. For example, if the user profile 114 includes an indication that the user enjoys camping and hiking, the server computer 112 can identify hiking and camping as activities. Similarly, if the user profile 114 indicates that the user is a student, the server computer 112 can identify studying or attending school as an activity. Other contemplated activities include, but are not limited to, biking, fishing, travelling, working, skiing, swimming, exercising, boating, hunting, entertaining, dining out, combinations thereof, or the like.

These activities (or others) can be identified in the user profile 114 by way of natural language searching, by way of explicit identifiers, combinations thereof, or the like. Thus, the user profile 114 can include tags or lists of activities, in some embodiments, where a user or other entity can interact with an entity such as the social networking service 116 to create the tags or lists of activities. Because the activities can be identified in operation 306 and/or by the user or other entity in additional and/or alternative ways, it should be understood that these examples are illustrative and therefore should not be construed as being limiting in any way.

From operation 306, the method 300 proceeds to operation 308. At operation 308, the server computer 112 can match the activities identified in operation 304 by analysis of the location data 124 with the activities identified in operation 306 by analysis of the user profile 114. In some embodiments, the server computer 112 can compare the activities identified in operation 304 by analysis of the location data 124 with the activities identified in operation 306 by analysis of the user profile 114. It can be appreciated that a first list of activities can be generated in operation 304, and that a second list of activities can be generated in operation 306. Thus, operation 308 can include the server computer 112 comparing the first list of activities to the second list of activities. Thus, for example, the server computer 112 can identify a first list in operation 304 as including exercising, hiking, and dining out, and a second list in operation 306 as including exercising, dining out, and working. By comparing these lists, the server computer 112 may confirm or verify exercising and dining out.

Similarly, in the above example lists, the server computer 112 may determine that hiking cannot be verified, and that working has been identified as an activity undertaken by a user associated with the computing device 102 and therefore should be added to the user profile 114. It can be appreciated that these changes and/or verifications can be made by way of the profile updates 126. Because the activities may be compared in additional or alternative manners, it should be understood that these examples are illustrative and therefore should not be construed as being limiting in any way.

From operation 308, the method 300 proceeds to operation 310. The method 300 ends at operation 310. It can be appreciated from the description of the method 200 in FIG. 2 that execution of the method 200 can continue after operation 310 with execution of operation 210. Thus, it can be appreciated that determining as illustrated and described with respect to operation 210 can include analyzing the results of the matching operation illustrated and described herein with reference to operation 308. It should be understood that this example is illustrative and therefore should not be construed as being limiting in any way.

Figure 4A:
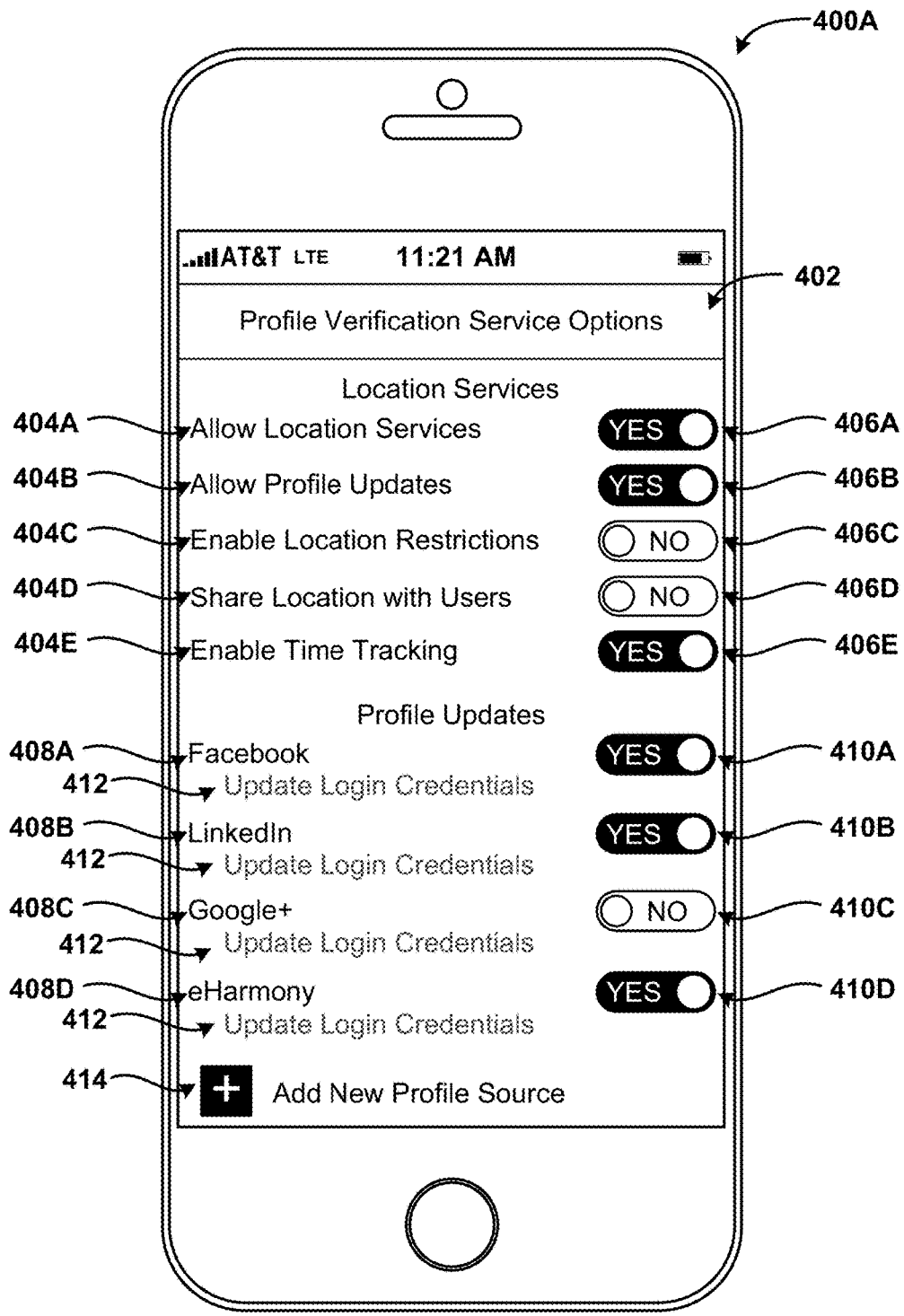
FIGS. 4A-4C are user interface diagrams showing illustrative screen displays for configuring and using a profile verification service, according to some illustrative embodiments.
Figure 4B:
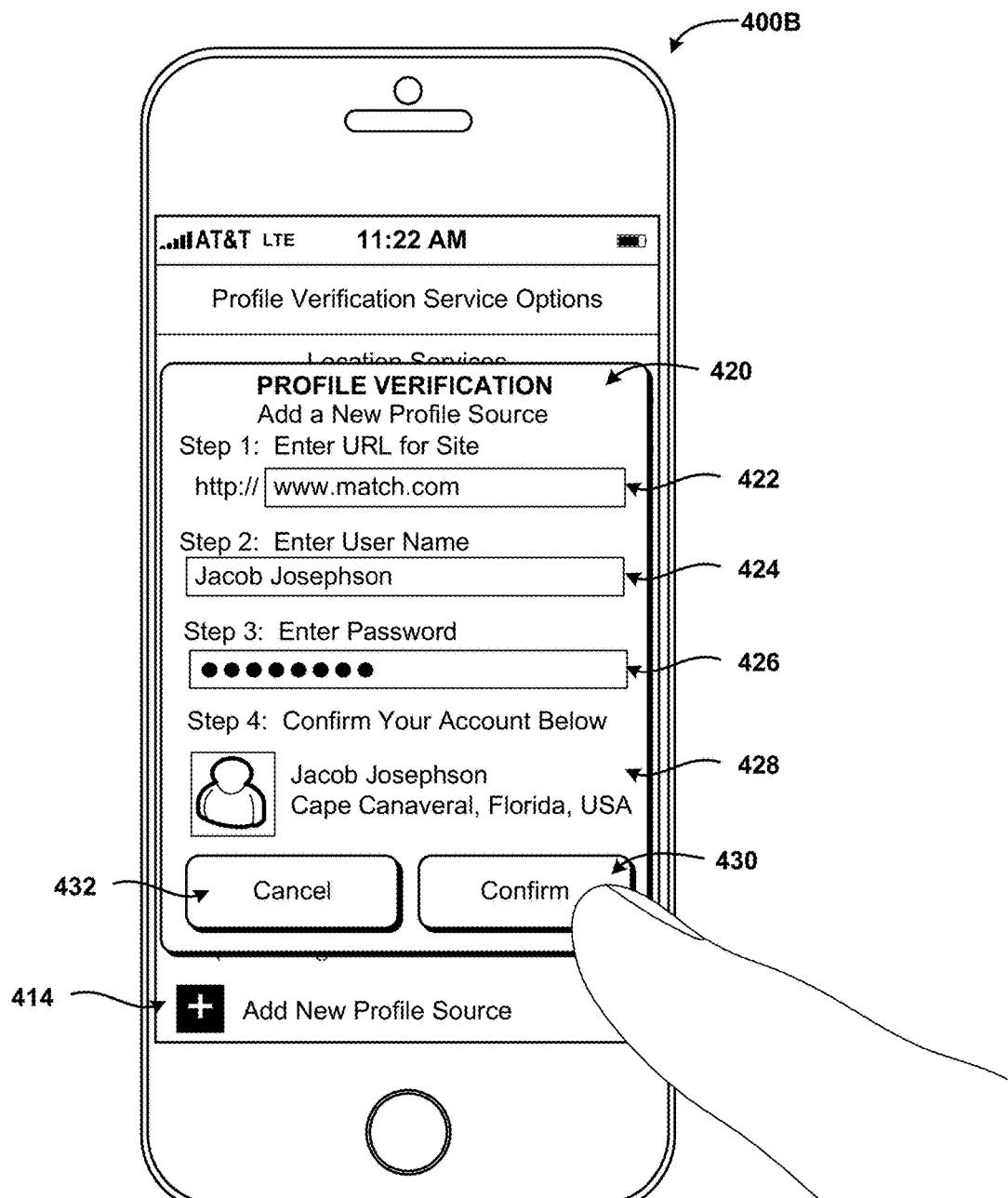
Figure 4C:
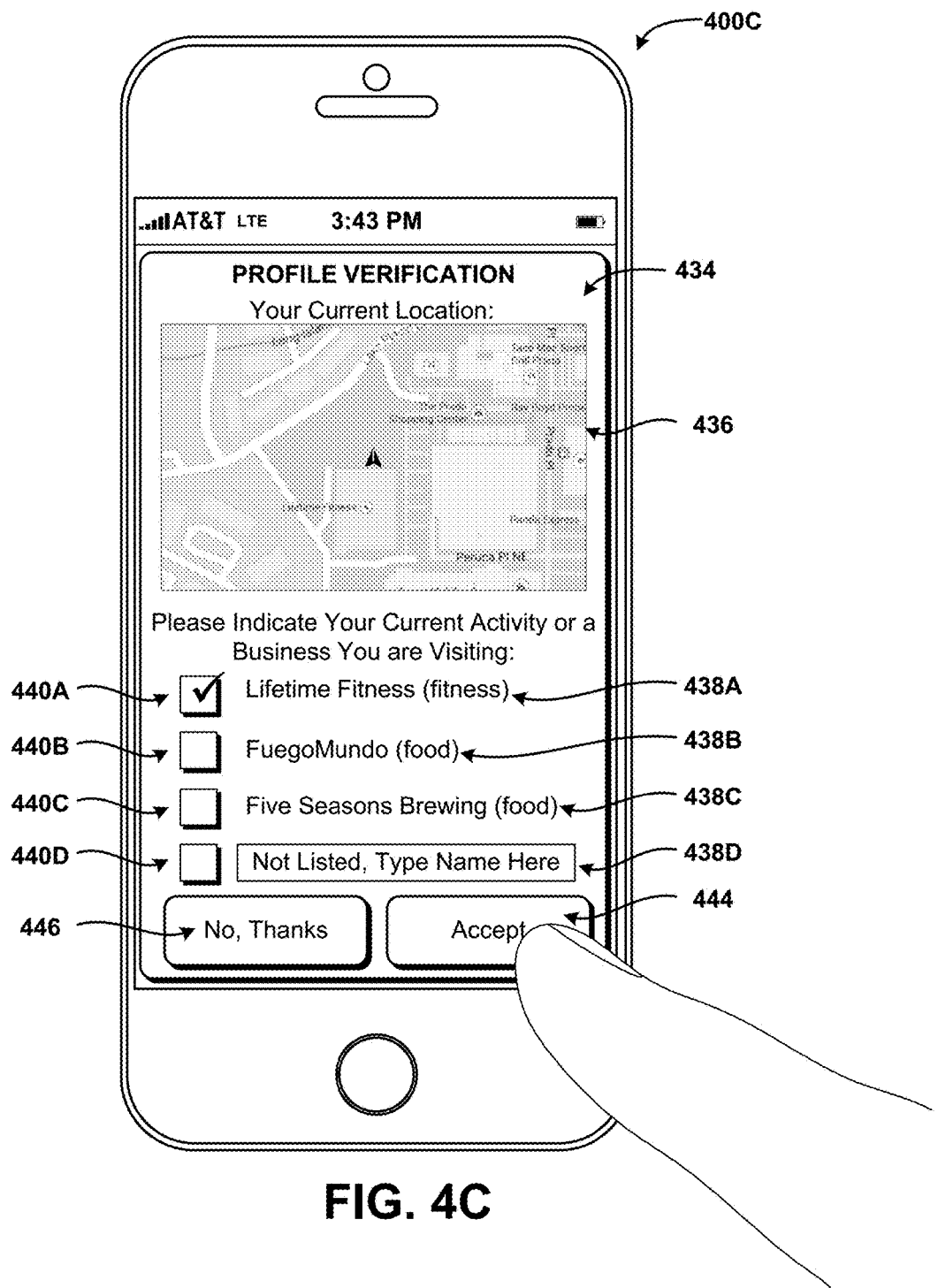

FIGS. 4A-4C are user interface ("UI") diagrams showing aspects of UIs for controlling and/or interacting with a profile verification service 110, according to some illustrative embodiments. FIG. 4A shows an illustrative screen display 400A, which can be generated by a device such as the computing device 102. According to various embodiments, the computing device 102 can generate the screen display 400A and/or other screen displays in conjunction with and/or based upon activation of a profile verification application that can be included as one of the application programs 108 and/or via interactions with the profile verification service 110 described herein, for example using a web browser or other application program 108. It should be appreciated that the UI diagram illustrated in FIG. 4A is illustrative of one contemplated example of the UIs that can be generated and/or displayed in accordance with the concepts and technologies disclosed herein, and therefore should not be construed as being limited in any way.

It should be appreciated that the screen display 400A can be presented, for example, in response to detecting selection of an option to manage options or settings for the profile verification service 110, in response to an interaction with the profile verification service 110, other triggers or events, combinations thereof, or the like. Because the screen display 400A illustrated in FIG. 4A can be displayed at additional and/or alternative times, it should be understood that this example is illustrative and therefore should not be construed as being limiting in any way.

The screen display 400A can include various menus and/or menu options (not shown in FIG. 4A). The screen display 400A also can include a profile verification service options display ("options display 402"). The options display 402 can be configured to allow a user or other entity to control various service options, illustrative examples of which are shown in FIG. 4A. As shown in FIG. 4A, the options display 402 can include a number of location service options 404A-E (hereinafter collectively and/or generically referred to as "location service options 404"). Each of the location service options 404 can have a corresponding location service selector 406A-E (hereinafter collectively and/or generically referred to as "location service selectors 406").

A user or other entity can interact with the location service selectors 406 to specify whether a corresponding location service option 404 is enabled or disabled, as generally is understood. In the illustrated embodiment, the location service selector 406A can be used to enable or disable an option to allow the profile verification service 110 to use location information relating to the computing device 102. The location service selector 406B can be used to enable or disable an option to allow the profile verification service 110 to update a user profile 114 associated with the computing device 102 and/or a user or other entity associated therewith. The location service selector 406C can be used to enable or disable an option to allow the profile verification service 110 to restrict the use of location information based on locations, time of day, or the like.

The location service selector 406D can be used to enable or disable an option to allow the profile verification service 110 to use share a location with other users of a social networking profile source or sites associated with the computing device 102 and/or a user thereof. The location service selector 406E can be used to enable or disable an option to allow the profile verification service 110 to use time tracking as part of the profile verification service 110. Because additional and/or alternative location service options 404 and/or location service selectors 406 can be included in the options display 402, it should be understood that these examples are illustrative and therefore should not be construed as being limiting in any way.

The options display 402 also can be configured to allow a user or other entity to control what user profiles 114 can be verified and/or updated by the profile verification service 110. In particular, as shown in FIG. 4A, the options display 402 can include a number of social networking profile source indicators 408A-D (hereinafter collectively and/or generically referred to as "social networking profile source indicators 408"). Each of the social networking profile source indicators 408 can have corresponding social networking profile source controls 410A-D (hereinafter collectively and/or generically referred to as "social networking profile source controls 410").

A user or other entity can interact with the social networking profile source controls 410 to specify a binary yes/no, true/false, activated/inactivated, enabled/disabled, or other indicator for a corresponding social networking profile source indicator 408. In some embodiments, the binary setting can be replaced with or supplemented by a multi-faceted response field, for example a drop down list that can include two or more choices. For example, the "Facebook" social networking profile source indicator 408A can have a dropdown list of settings instead of the illustrated social networking profile source control 410A. The dropdown list or other control can include settings of "Always," "Never," and/or other options such as specific times or situations under which profile updates to Facebook will be allowed or denied, among other options. Thus, while in the illustrated embodiment, the social networking profile source controls 410 can provide a binary setting for selection by the user or other entity, it should be understood that this example is illustrative and therefore should not be construed as being limiting in any way.

In the illustrated embodiment, the social networking profile source control 410A can be used to activate or deactivate an option to allow social networking updates to a FACEBOOK social networking profile or other user profile 114 associated with the user. The social networking profile source control 410B can be used to activate or deactivate an option to allow social networking updates to a LINKEDIN social networking profile or other user profile 114 associated with the user. The social networking profile source control 410C can be used to activate or deactivate an option to allow social networking updates to a GOOGLE+ social networking profile or other user profile 114 associated with the user. The social networking profile source control 410D can be used to activate or deactivate an option to allow social networking updates to an EHARMONY social networking profile or other user profile 114 associated with the user. Because additional and/or alternative social networking profile source controls 410 can be included in the options display 402, it should be understood that these examples are illustrative and therefore should not be construed as being limiting in any way.

As shown in FIG. 4A, the social networking profile source indicators 408 can be displayed with an update login credentials control 412. Selection of the update login credentials control can cause the computing device 102 to display a window or other user interface or user interface element for updating login credentials associated with the profile source indicated by the respective social networking profile source indicator 408. Thus, a user or other entity can update a password, login, or delete a social networking profile source using the update login credentials control 412. Login credentials can be updated in a manner that can be substantially similar to a manner in which profile sources can be added as illustrated and described below with reference to FIG. 4B. Because login credentials can be updated in additional and/or alternative ways, it should be understood that this example is illustrative and therefore should not be construed as being limiting in any way.

The options display 402 also can include a user interface ("UI") control 414. The UI control 414 can be configured to allow a user or other entity to allow social networking profile updates or other account updates (e.g., dating sites, professional resume sites, or the like) for a social networking profile or other user profile 114 associated with the user. Upon selection or other interaction with the UI control 414, the computing device 102 can interact with the profile verification service 110 and/or one or more application programs 108 to create a link between the profile verification service 110 and a user profile 114 or other information associated with the user or other entity. According to some embodiments, selection of the UI control 414 can result in display of a user interface for adding a new profile source, as will be illustrated and described below with reference to FIG. 4B. Because user profiles 114 and/or profile sources can be added in additional and/or alternative ways, it should be understood that this example is illustrative and therefore should not be construed as being limiting in any way.

Referring now to FIG. 4B, a UI diagram showing additional aspects of the concepts and technologies disclosed herein for providing a profile verification service 110 is described in detail. In particular, FIG. 4B shows an illustrative screen display 400B, which can be generated by a device such as the computing device 102. It should be appreciated that the UI diagram illustrated in FIG. 4B is illustrative of one contemplated example of the UIs that can be generated and/or displayed in accordance with the concepts and technologies disclosed herein, and therefore should not be construed as being limited in any way.

The screen display 400B can include an add profile source window 420. The add profile source window 420 can be used to link a user profile, social networking profile, dating service profile, or the like, to a profile verification service 110. It can be appreciated that the add profile source window 420 can be presented in response to a user selecting an option to add a new profile via interacting with the UI control 414 shown in FIG. 4A and/or via other interactions with the computing device 102. Because the add profile source window 420 can be displayed at additional and/or alternative times and/or in response to other actions, it should be understood that this example is illustrative, and should not be construed as being limiting in any way.

The add profile source window 420 can be configured to allow a user or other entity to indicate a user profile 114, social networking account, dating service profile or account, or other information source. In the illustrated embodiment, the add profile source window 420 can include a profile source uniform resource locator ("URL") field 422. Because other source identifiers such as file locations, uniform resource indicators ("URIs") and/or other locations can be indicated in the profile source URL field 422, it should be understood that these examples are illustrative and therefore should not be construed as being limiting in any way.

The add profile source window 420 also can include a profile username field 424. The profile username field 424 can be used by a user or other entity to input a name, a username, a userID, or other identifying information that can be used at the site or location indicated in the profile source URL field 422 to identify the user, account, profile, or other information associated with a user or other entity. The add profile source window 420 also can include a profile password field 426. The profile password field 426 can be used by a user or other entity to input a password, pass code, or other information that can be used to authenticate a user or other entity as being authorized to access the user, account, profile, or other information associated with a user or other entity. Because a profile source, username, password, and/or other information can be obtained from a user or other entity in various manners, it should be understood that the illustrated embodiment is illustrative and should not be construed as being limiting in any way.

Upon entering data identifying the profile source, username, and/or password via interactions with the profile source URL field 422, the profile username field 424, and/or the profile password field 426, the add profile source window 420 can display a user profile information area 428 to allow a user or other entity to verify that the information has been correctly entered. According to various embodiments, the user profile information area 428 can be blank until data is entered into the profile source URL field 422, the profile username field 424, and/or the profile password field 426.

Once data is entered into the profile source URL field 422, the profile username field 424, and/or the profile password field 426, the computing device 102 can communicate with the resource 118 that hosts the user profile 114 and display information associated with the identified account in the user profile information area 428 for verification. A user or other entity can confirm the user profile 114 or cancel (if the information is not correct) via interactions with the confirm user profile UI control 430 or the cancel UI control 432. Because a user profile 114 can be confirmed in additional and/or alternative ways, and because the add profile process can be exited in additional and/or alternative ways, it should be understood that the illustrated embodiment is illustrative and therefore should not be construed as being limiting in any way.

It should be understood that if the user or other entity selects the confirm user profile UI control 430, the user profile 114 associated with the information entered in the profile source URL field 422, the profile username field 424, and/or the profile password field 426 can be linked to the profile verification service 110. Thus, the screen display 400A illustrated and described in FIG. 4A can be updated to list the user profile 114 or account indicated in the add profile source window 420 as illustrated and described in FIG. 4B. It should be understood that this example is illustrative and therefore should not be construed as being limiting in any way.

Referring now to FIG. 4C, a UI diagram showing additional aspects of the concepts and technologies disclosed herein for providing and/or interacting with a profile verification service 110 is described in detail. In particular, FIG. 4C shows an illustrative screen display 400C, which can be generated by a device such as the computing device 102 via interactions with one or more of the application programs 108 and/or the profile verification service 110. It should be appreciated that the UI diagram illustrated in FIG. 4C is illustrative of one contemplated example of the UIs that can be generated and/or displayed in accordance with the concepts and technologies disclosed herein, and therefore should not be construed as being limited in any way.

The screen display 400C can include a location-activity association window 434. The location-activity association window 434 can be presented, for example, in response to a user or other entity selecting an option to create an association between a location and an action or activity, in response to the profile verification service 110 requesting information from the computing device 102 (for example in response to receiving the location data 124 from a location server 122 as illustrated and described above with reference to FIG. 1), and/or in response to other actions or triggers. Because the location-activity association window 434 can be displayed at additional and/or alternative times and/or in response to other manipulations and/or interactions with the computing device 102 and/or the profile verification service 110, it should be understood that this embodiment is illustrative, and should not be construed as being limiting in any way.

In some embodiments, as shown in FIG. 4C, the location-activity association window 434 can include a map display 436. The map display 436 can show a current location of the computing device 102 in a map format, as generally is understood. The location-activity association window 434 also can display one or more business or activity indicators 438A-D (hereinafter collectively and/or generically referred to as "business or activity indicators 438"). The business or activity indicators 438 can indicate a business associated with a current location of the computing device 102, an institution or other venue associated with a current location of the computing device 102, an activity associated with the current location of the computing device 102, or the like.

In some embodiments, the business, institution, or other entity at the location can indicate an activity or action associated with the location. For example, an amusement park or concert venue can have a venue or business name, as well as an activity associated with the location (in this case "entertainment"). Similarly, a fitness center can have an activity of fitness associated therewith. Thus, the location-activity association window 434 can display business names, institution names, venue names, activities, or the like as the business or activity indicators 438. It should be understood that these examples are illustrative and therefore should not be construed as being limiting in any way.

A user or other entity can select a UI control 440 associated with a corresponding business or activity indicator 438 or enter a business, institution, venue, or activity name in a field 438D, if desired. Upon selecting or entering a business or activity (activities are shown in parenthesis in FIG. 4C), the user or other entity can either accept the choice via an interaction with an accept control 444 or exit, cancel, or decline to identify the business or activity via an interaction with a cancel or other control 446. It should be understood that this example is illustrative and therefore should not be construed as being limiting in any way.

Figure 5:
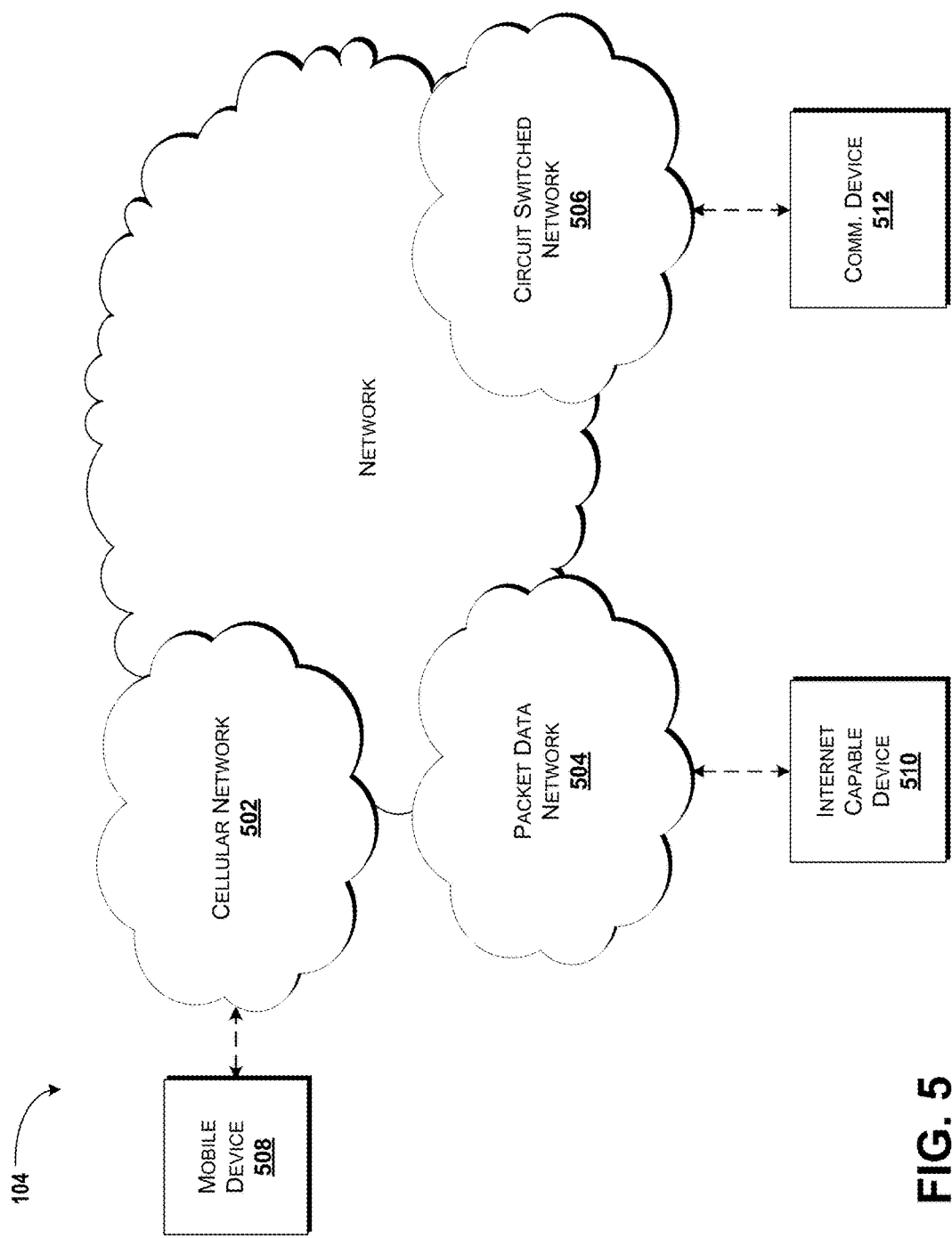
FIG. 5 schematically illustrates a network, according to an illustrative embodiment of the concepts and technologies described herein.

Turning now to FIG. 5, additional details of the network 104 are illustrated, according to an illustrative embodiment. The network 104 includes a cellular network 502, a packet data network 504, for example, the Internet, and a circuit switched network 506, for example, a publicly switched telephone network ("PSTN"). The cellular network 502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 502 also includes radios and nodes for receiving and transmitting voice, data, and combinations thereof to and from radio transceivers, networks, the packet data network 504, and the circuit switched network 506.

A mobile communications device 508, such as, for example, a cellular telephone, a user equipment, a mobile terminal, a PDA, a laptop computer, a handheld computer, and combinations thereof, can be operatively connected to the cellular network 502. The cellular network 502 can be configured as a 2G GSM network and can provide data communications via GPRS and/or EDGE. Additionally, or alternatively, the cellular network 502 can be configured as a 3G UMTS network and can provide data communications via the HSPA protocol family, for example, HSDPA, EUL (also referred to as HSUPA), and HSPA+. The cellular network 502 also is compatible with 4G mobile communications standards as well as evolved and future mobile standards.

The packet data network 504 includes various devices, for example, servers, computers, databases, and other devices in communication with another, as is generally known. The packet data network 504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 504 includes or is in communication with the Internet. The circuit switched network 506 includes various hardware and software for providing circuit switched communications. The circuit switched network 506 may include, or may be, what is often referred to as a plain old telephone system (POTS). The functionality of a circuit switched network 506 or other circuit-switched network are generally known and will not be described herein in detail.

The illustrated cellular network 502 is shown in communication with the packet data network 504 and a circuit switched network 506, though it should be appreciated that this is not necessarily the case. One or more Internet-capable devices 510, for example, a PC, a laptop, a portable device, or another suitable device, can communicate with one or more cellular networks 502, and devices connected thereto, through the packet data network 504. It also should be appreciated that the Internet-capable device 510 can communicate with the packet data network 504 through the circuit switched network 506, the cellular network 502, and/or via other networks (not illustrated).

As illustrated, a communications device 512, for example, a telephone, facsimile machine, modem, computer, or the like, can be in communication with the circuit switched network 506, and therethrough to the packet data network 504 and/or the cellular network 502. It should be appreciated that the communications device 512 can be an Internet-capable device, and can be substantially similar to the Internet-capable device 510. In the specification, the network 104 is used to refer broadly to any combination of the networks 502, 504, 506. It should be appreciated that substantially all of the functionality described with reference to the network 104 can be performed by the cellular network 502, the packet data network 504, and/or the circuit switched network 506, alone or in combination with other networks, network elements, and the like.

According to various implementations, the computing device 102, the server computer 112, and/or the resource 118 can use any combination of the devices disclosed herein including, but not limited to, the mobile communications device 508, the Internet-capable device 510, and/or the communications device 512 to provide the functionality described herein for providing a profile verification service 110. As such, it should be understood that the computing device 102, the server computer 112, the resource 118, and/or the data store 130 can interact with one another via any number and/or combination of devices and networks.

Figure 6:
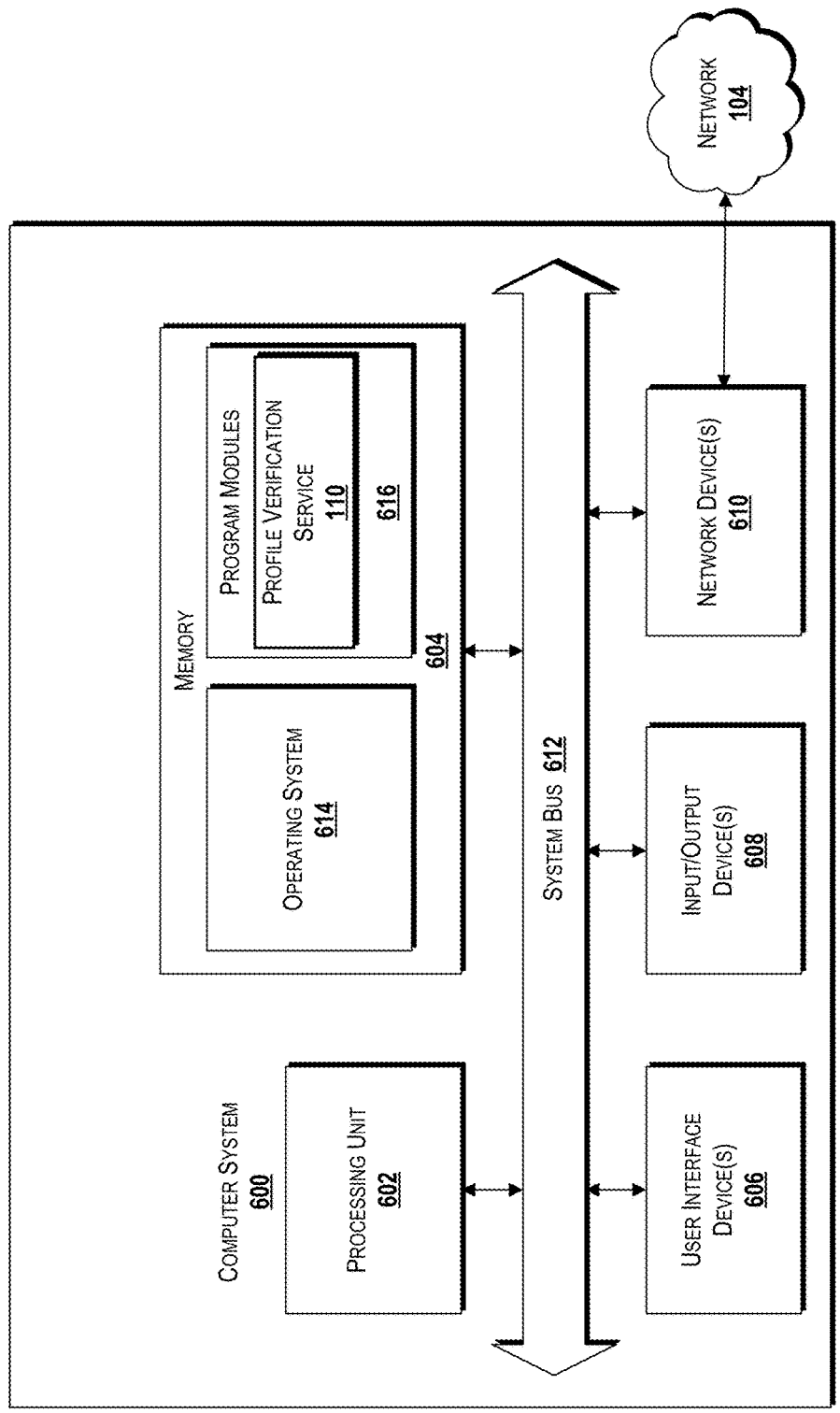
FIG. 6 is a block diagram illustrating an example computer system configured to provide a profile verification service, according to some illustrative embodiments of the concepts and technologies described herein.

FIG. 6 is a block diagram illustrating a computer system 600 configured to provide the functionality described herein for providing a profile verification service 110, in accordance with various embodiments of the concepts and technologies disclosed herein. The computer system 600 includes a processing unit 602, a memory 604, one or more user interface devices 606, one or more input/output ("I/O") devices 608, and one or more network devices 610, each of which is operatively connected to a system bus 612. The bus 612 enables bi-directional communication between the processing unit 602, the memory 604, the user interface devices 606, the I/O devices 608, and the network devices 610.

The processing unit 602 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 604 communicates with the processing unit 602 via the system bus 612. In some embodiments, the memory 604 is operatively connected to a memory controller (not shown) that enables communication with the processing unit 602 via the system bus 612. The memory 604 includes an operating system 614 and one or more program modules 616. The operating system 614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 616 may include various software and/or program modules described herein. In some embodiments, for example, the program modules 616 can include the application programs 108, the profile verification service 110, and/or the social networking service 116. This and/or other programs can be embodied in computer-readable media containing instructions that, when executed by the processing unit 602, perform one or more of the methods 200, 300 described in detail above with respect to FIGS. 2, 3. According to embodiments, the program modules 616 may be embodied in hardware, software, firmware, or any combination thereof. Although not shown in FIG. 6, it should be understood that the memory 604 also can be configured to store the user profile 114, the profile data 120, the location data 124, the profile updates 126, the profile verification data 128, and/or other data, if desired.

By way of example, and not limitation, computer-readable media may include any available computer storage media or communication media that can be accessed by the computer system 600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 600. In the claims, the phrase "computer storage medium" and variations thereof does not include waves or signals per se and/or communication media.

The user interface devices 606 may include one or more devices with which a user accesses the computer system 600. The user interface devices 606 may include, but are not limited to, computers, servers, personal digital assistants, cellular phones, or any suitable computing devices. The I/O devices 608 enable a user to interface with the program modules 616. In one embodiment, the I/O devices 608 are operatively connected to an I/O controller (not shown) that enables communication with the processing unit 602 via the system bus 612. The I/O devices 608 may include one or more input devices, such as, but not limited to, a keyboard, a mouse, or an electronic stylus. Further, the I/O devices 608 may include one or more output devices, such as, but not limited to, a display screen or a printer.

The network devices 610 enable the computer system 600 to communicate with other networks or remote systems via a network, such as the network 104. Examples of the network devices 610 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 7:
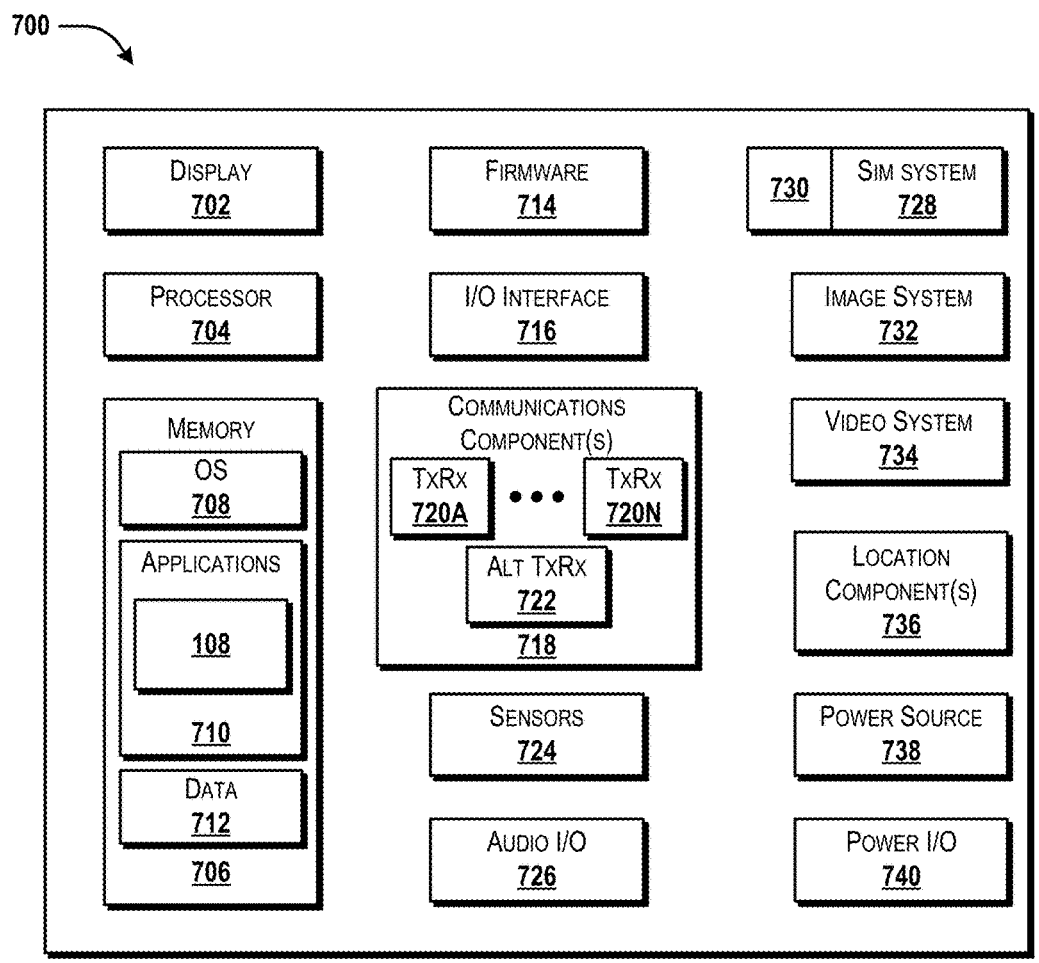
FIG. 7 is a block diagram illustrating an example mobile device configured to interact with a profile verification service, according to some illustrative embodiments of the concepts and technologies described herein.

Turning now to FIG. 7, an illustrative mobile device 700 and components thereof will be described. In some embodiments, the computing device 102 described above with reference to FIGS. 1-4C can be configured as and/or can have an architecture similar or identical to the mobile device 700 described herein in FIG. 7. It should be understood, however, that the computing device 102 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements for identifying locations, identifying activities associated with locations, obtaining settings associated with a profile verification service 110, interacting with the profile verification service 110, choosing location services that will or will not be used in accordance with the profile verification service 110, text, images, video, virtual keypads and/or keyboards, messaging data, notification messages, metadata, internet content, device status, time, date, calendar data, device preferences, map and location data, combinations thereof, and/or the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708, one or more applications 710 such as the application programs 108, the profile verification service 110, the social networking service 116, other computer-executable instructions stored in a memory 706, or the like. In some embodiments, the applications 710 also can include a UI application (not illustrated in FIG. 7).

The UI application can interface with the operating system 708, such as the operating system 106 shown in FIG. 1, to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, controlling options or settings associated with the profile verification service 110, to adding or creating links between user profiles 114 and a profile verification service 110, indicating an activity associated with a particular location, manipulating address book content and/or settings, multimode interaction, interacting with other applications 710, and otherwise facilitating user interaction with the operating system 708, the applications 710, and/or other types or instances of data 712 that can be stored at the mobile device 700.

The data 712 can include, for example, the user profile 114, the profile data 120, the location data 124, the profile updates 126, the profile verification data 128 and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, account information, usage history and/or trends, billing information, user information, organization information, presence status information, user IDs, passwords, and application initiation (start-up) requests. In some embodiments, the I/O interface 716 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 104 described herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using GSM, CDMAONE, CDMA2000, LTE, and various other 2G, 2.5G, 3G, 4G, and greater generation technology standards. Moreover, the communications component 718 may facilitate communications over various channel access methods (which may or may not be used by the aforementioned standards) including, but not limited to, TDMA, FDMA, W-CDMA, OFDM, SDMA, and the like.

In addition, the communications component 718 may facilitate data communications using GPRS, EDGE, the HSPA protocol family including HSDPA, EUL or otherwise termed HSUPA, HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from global positioning system ("GPS") devices, assisted-GPS ("A-GPS") devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Based on the foregoing, it should be appreciated that systems and methods for providing and/or interacting with a profile verification service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method comprising:
receiving, at a processor executing a profile verification service and from a first computing device, a request to verify a user profile of a user of a social networking service;
identifying, by the processor and based on profile verification data, a second computing device that is associated with the user profile;
obtaining, by the processor, location data that indicates geographic locations visited by the second computing device and times spent by the second computing device at the geographic locations visited by the second computing device;
analyzing, by the processor, the location data to determine a location-based activity that is associated with one of the geographic locations visited, wherein the location-based activity is determined based on a time spent at the one of the geographic locations by the second computing device;

determining, by the processor and based on analyzing the user profile, an activity included in the user profile, wherein the user profile indicates that the user performs the activity;

determining, by the processor, if the user profile is accurate based on determining whether the location-based activity matches the activity;

if a determination is made that the user profile is accurate, providing, to the first computing device, an indication that the user profile is verified; and if a determination is made that the user profile is not accurate, generating, by the processor, a profile update and providing the profile update to the first computing device to update the user profile.

2. A system comprising:

a processor; and a memory that stores computer-executable instructions that, when executed by the processor, cause the processor to perform operations comprising receiving, from a first computing device, a request to verify a user profile of a user of a social networking service, identifying, based on profile verification data, a second computing device that is associated with the user profile, obtaining location data that indicates geographic locations visited by the second computing device and times spent by the second computing device at the geographic locations visited by the second computing device, analyzing the location data to determine a location-based activity that is associated with one of the geographic locations visited, wherein the location-based activity is determined based on a time spent at the one of the geographic locations by the second computing device, determining, based on analyzing the user profile, an activity included in the user profile, wherein the user profile indicates that the user performs the activity, determining if the user profile is accurate based on determining whether the location-based activity matches the activity, if a determination is made that the user profile is accurate, providing, to the first computing device, an indication that the user profile is verified, and if a determination is made that the user profile is not accurate, generating a profile update and providing the profile update to the first computing device to update the user profile.

3. A computer storage medium having computer-executable instructions stored thereon that, when executed by a processor, cause the processor to perform operations comprising:

receiving, from a first computing device, a request to verify a user profile of a user of a social networking service;

identifying, based on profile verification data, a second computing device that is associated with the user profile;

obtaining location data that indicates geographic locations visited by the second computing device and times spent by the second computing device at the geographic locations visited by the second computing device;

analyzing the location data to determine a location-based activity that is associated with one of the geographic locations visited, wherein the location-based activity is determined based on a time spent at the one of the geographic locations by the second computing device;

determining, based on analyzing the user profile, an activity included in the user profile, wherein the user profile indicates that the user performs the activity;

determining if the user profile is accurate based on determining whether the location-based activity matches the activity;

if a determination is made that the user profile is accurate, providing, to the first computing device, an indication that the user profile is verified; and if a determination is made that the user profile is not accurate, generating a profile update and providing the profile update to the first computing device to update the user profile.

4. The method of claim 1, wherein identifying the location-based activity further comprises causing the second computing device to present a user interface at the second computing device to obtain an indication that identifies the location-based activity as being associated with the one of the geographic locations.

5. The method of claim 1, wherein the profile verification data is obtained via interactions with a user interface displayed at the second computing device, the user interface comprising a plurality of location service selectors and a plurality of social networking profile source controls.

6. The method of claim 1, wherein identifying the location-based activity further comprises identifying a business located at the one of the geographic locations.

7. The method of claim 1, wherein the profile verification data reflects trends associated with the second computing device and the user profile.

8. The method of claim 1, wherein the time comprises a period of time.

9. The method of claim 1, wherein the social networking service comprises a dating service, wherein the user profile is associated with the dating service, and wherein the user profile is verified for purposes of ensuring personal safety of a further user of the dating service.

10. The method of claim 1, wherein the first computing device comprises a server computer that hosts the social networking service.

11. The method of claim 1, wherein the location data indicates physical movements of the second computing device.

12. The system of claim 2, wherein updating the user profile comprises:

identifying an inaccuracy in the user profile, wherein the inaccuracy relates to the activity;

generating a profile update that is based on the location-based activity, wherein the profile update relates to the activity; and sending the profile update to the social networking service to update the user profile.

13. The system of claim 2, wherein obtaining the location data comprises receiving the location data from an element of a cellular communications network, wherein the cellular communications network supports cellular communication of the second computing device, and wherein the second computing device comprises a smartphone.

14. The system of claim 2, wherein the social networking service comprises a dating service, wherein the user profile is associated with the dating service, and wherein the user profile is verified for purposes of ensuring personal safety of a further user of the dating service.

15. The system of claim 2, wherein the first computing device comprises a server computer that hosts the social networking service.

16. The system of claim 2, wherein the location data indicates physical movements of the second computing device.

17. The computer storage medium of claim 3, wherein the social networking service comprises a dating service, and wherein the user profile is verified for purposes of ensuring personal safety of a further user of the dating service.

18. The computer storage medium of claim 3, wherein updating the user profile comprises:
   identifying an inaccuracy in the user profile, wherein the inaccuracy relates to the activity;
   generating a profile update that is based on the location-based activity, wherein the profile update relates to the activity; and
   sending the profile update to the social networking service to update the user profile.

19. The computer storage medium of claim 3, wherein the first computing device comprises a server computer that hosts the social networking service.

20. The computer storage medium of claim 3, wherein the location data indicates physical movements of the second computing device.

* * * * *